(12) United States Patent
Taguchi et al.

(10) Patent No.: US 9,651,681 B2
(45) Date of Patent: May 16, 2017

(54) RADIATION MONITOR

(71) Applicant: Mitsubishi Electric Corporation, Chiyoda-ku, Tokyo (JP)

(72) Inventors: Masaki Taguchi, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 206 days.

(21) Appl. No.: 14/819,589

(22) Filed: Aug. 6, 2015

(65) Prior Publication Data

US 2016/0291166 A1 Oct. 6, 2016

(30) Foreign Application Priority Data

Apr. 3, 2015 (JP) ................... 2015-076483

(51) Int. Cl.
*G01J 1/00* (2006.01)
*G01T 1/167* (2006.01)
*G21D 1/00* (2006.01)
*G21D 3/00* (2006.01)

(52) U.S. Cl.
CPC ............... *G01T 1/167* (2013.01); *G21D 1/00* (2013.01); *G21D 3/00* (2013.01)

(58) Field of Classification Search
CPC .... G01T 1/17; G01T 7/00; G01T 1/02; G01T 1/161; G01T 1/29
See application file for complete search history.

(56) References Cited

U.S. PATENT DOCUMENTS

| 4,445,167 A | 4/1984 | Okado | |
| 5,610,958 A * | 3/1997 | Shimano | F04B 49/10 376/277 |
| 2005/0262852 A1* | 12/2005 | Amundsen | F04B 37/08 62/55.5 |

(Continued)

FOREIGN PATENT DOCUMENTS

| JP | 50-60284 | 5/1975 |
| JP | 58-86873 A | 5/1983 |

(Continued)

*Primary Examiner* — David Porta
*Assistant Examiner* — Mamadou Faye
(74) *Attorney, Agent, or Firm* — Buchanan Ingersoll & Rooney PC

(57) ABSTRACT

A radiation monitor includes an AC control section and a DC control section. The AC control section outputs an AC power source instantaneous power failure detection signal to the DC control section when a decrease in AC voltage is detected. The DC control section measures a duration time of an AC power source instantaneous power failure detection signal when the AC power source instantaneous power failure detection signal is received from the AC control section and outputs an instantaneous power failure restart signal to the AC control section if the AC voltage is restored within a time shorter than a set value. The AC control section performs switching control from close to open of the sampling solenoid valve, the purge solenoid valve, and the exhaust solenoid valve, and restarts the pump after a constant time when the instantaneous power failure restart signal is received from the DC control section.

9 Claims, 10 Drawing Sheets

(56) References Cited

U.S. PATENT DOCUMENTS

2015/0101392 A1* 4/2015 Foote ..................... G01N 1/24
73/23.2

FOREIGN PATENT DOCUMENTS

| JP | 2-184294 A | 7/1990 |
| JP | 5-56682 A | 3/1993 |
| JP | 7-274376 A | 10/1995 |
| JP | 2000-358377 A | 12/2000 |
| JP | 2001-153956 A | 6/2001 |
| JP | 2004-140896 A | 5/2004 |
| JP | 2011-38823 A | 2/2011 |

* cited by examiner

Figure 3

| Logic Symbol | Function |
|---|---|
| | AND |
| | OR |
| | NOT |
| Input Reset | Thermal Relay (Latch Type Self-holding) |
| | On Delay Timer |
| | Off Delay Timer |
| SW | Switch |
| Th | Thermal Relay |
| -o- | Contact Interface |
| ...... | DC Line (Thin Line) |
| — | AC Line (Thick Line) |

Power Source OFF

RADIATION MONITOR

TECHNICAL FIELD

The present invention relates to radiation monitors and, more particularly, relates to a radiation monitor to be installed for performing monitoring, release control, and the like of radioactive materials.

BACKGROUND ART

Radiation monitors are installed in a nuclear reactor facilities and the like for measuring radioactivity concentration of a radioactive rare gas in an exhaust gas. The exhaust gas is discharged from, for example, an exhaust stack that is a final discharge end of the facilities. The radiation monitor samples the exhaust gas of the exhaust stack and detects radiation released from the radioactive rare gas in a sampling gas. The radioactivity concentration is found by measuring a detection signal thereof (for example, see Patent Documents 1 to 5).

"Guidelines for measurement of released radioactive materials in light water nuclear power reactor facilities" are defined as domestic guidelines relating to the radiation monitor. According to the domestic guidelines pertaining to this release control, a detection unit is purged by air defecated by filters or the like and then background of the radiation is measured.

As for switching of flow paths of a sampling gas, ON/OFF switching of solenoid valves is performed in conjunction with a manipulation for selecting the flow paths for sampling and purge by switching. A state for selecting the flow paths is automatically indicated in order to prevent from forgetting manual switchback (see, for example, Patent Document 6). Normally, a flowmeter and pressure gauges are installed in gas flow paths of a radiation monitor of this kind. When abnormality of the gas flow paths is detected, a pump is automatically stopped and a system is automatically isolated by a solenoid valve (see, for example, see Patent Document 7).

A pump automatic restart circuit is provided for a pump stop due to instantaneous interruption of a supplied AC power source. The pump automatic restart circuit outputs a pump start signal with a set time interval when the power source is restored in a limited case where the power source is instantaneously interrupted within a set allowed time (see, for example, see Patent Document 8). Furthermore, normally, a sampling solenoid valve for selecting flow paths in an open state uses one that is operated to be opened in non-excitation/closed in excitation. In instantaneous power failure automatic restart, reliability of instantaneous power failure automatic restart is improved by securing the open state of a sampling flow path (see, for example, Patent Document 9).

PRIOR ART DOCUMENT

Patent Document

[Patent Document 1] JP-A-S58-86873
[Patent Document 2] JP-A-H2-184294
[Patent Document 3] JP-A-H5-56682
[Patent Document 4] JP-A-2000-358377
[Patent Document 5] JP-A-2004-140896
[Patent Document 6] JP-A-2001-153956
[Patent Document 7] JP-A-S50-60284
[Patent Document 8] JP-A-H7-274376
[Patent Document 9] JP-A-2011-38823

SUMMARY OF THE INVENTION

Problems to be Solved by the Invention

The radiation monitor is thus configured, and a plurality of solenoid valves are provided for the purpose of switching the flow paths of the sampling and the purge and isolating a sampling unit when the pump is stopped. The sampling solenoid valve that is normally used in the open state uses one that is to be opened in non-excitation/closed in excitation; and thus, a change in flow path disappears when the power source is restored from the instantaneous power failure of the power source and pump automatic restart is ensured to improve reliability.

However, in a flow of recent control digitization, it is shifted from a period in which a pump and a solenoid valve are controlled by only an AC control circuit that is operated by an AC power source to a period in which an AC control circuit is indirectly controlled by a DC control circuit that is operated by a DC power source, except for a contactor, a relay, and the like, which directly control a pump and a solenoid valve. For example, a flow path abnormality alarm signal which is for automatically stopping the pump by detecting abnormality of piping with, for example, a flowmeter and a pressure gauge is transmitted from a sequencer that is operated by the DC power source generated by being converted from the AC power source.

The DC power source is equipped with a large capacity capacitor; and accordingly, transient response of a DC voltage of the DC power source in the case of instantaneous interruption of the AC power source and restoration of the power source are changed in a complicated manner depending on an instantaneous power failure time. A change with age of a solenoid valve operating time delicately influences on the complicated change and deviation from a formal sequential operation in instantaneous power failure automatic restart occurs.

The present invention has been made to solve the above described problem, and an object of the present invention is to obtain a highly reliable radiation monitor in which, in restoration of a power source after an instantaneous power failure of a plant power source system, automatic restart of a radiation monitor is surely performed and measurement omission due to a failure of instantaneous power failure automatic restart is not caused.

Means for Solving the Problems

According to the present invention, there is provided a radiation monitor including: a gas flow path in which a sampling solenoid valve, a purge solenoid valve, a pump, and an exhaust solenoid valve, each being operated by an AC electric power, are provided, and a sampling gas suctioned from a sampling point is circulated; a flow sensor installed in the gas flow path; a pressure sensor installed in the gas flow path; an AC control section in which the AC electric power is supplied to the sampling solenoid valve, the purge solenoid valve, the pump, and the exhaust solenoid valve, and when a flow path abnormality signal is received, the sampling solenoid valve, the purge solenoid valve, and the exhaust solenoid valve are controlled to be closed and the pump is stopped; a DC control section which is operated by a DC electric power in which the AC electric power supplied from the AC control section is converted, and outputs the flow path abnormality signal in the case where a measured value of the flow sensor or a measured value of the pressure sensor is lower than a set value; a detection unit which detects radiation to be released from the sampling gas suctioned to the gas flow path, and outputs a detection signal; and a measurement unit which measures the detection signal outputted from the detection unit, and outputs radioactivity concentration. The AC control section outputs an AC power source instantaneous power failure detection signal to the DC control section when a decrease in AC voltage is detected; the DC control section measures a duration time of the AC power source instantaneous power failure detection signal when the AC power source instantaneous power failure detection signal is received from the AC control section, and outputs an instantaneous power failure restart signal to the AC control section if the AC voltage is restored within a time shorter than the set value; and the AC control section performs switching control from close to open of the sampling solenoid valve, the purge solenoid valve, and the exhaust solenoid valve, and restarts the pump after a constant time when the instantaneous power failure restart signal is received from the DC control section.

Advantageous Effect of the Invention

In the radiation monitor according to the present invention, the control unit includes: the AC control section which directly controls sampling by the AC power source; and the DC control section which is operated by the DC voltage generated from the AC power source supplied from the AC control section and indirectly controls the sampling unit via the AC control section. The AC control section includes AC power source instantaneous power failure detection means which detects instantaneous stop (instantaneous power failure) within a time set in the AC power source and outputs the AC power source instantaneous power failure detection signal. The DC control section inputs parameters to judge the presence or absence of abnormality of the flow path, outputs the flow path abnormality alarm (signal) in flow path abnormality to stop the pump, and controls all the solenoid valves to be closed. Furthermore, if the AC power source instantaneous power failure detection signal is inputted, the DC control section blocks the output of the flow path abnormality alarm (signal) during a time set from the input to reset self-holding of the flow path abnormality alarm (signal), and outputs the instantaneous power failure restart signal that automatically restarts the pump to the AC control section. By such a configuration, there can be provided the highly reliable radiation monitor in which the pump can be surely automatically restarted without depending on a voltage state of the DC power source during instantaneous power failure of the AC power source and until restoration of the AC power source.

BRIEF DESCRIPTION OF THE DRAWINGS

FIG. 3 is a view representing the relationship between a logic symbol and a function.

MODE FOR CARRYING OUT THE INVENTION

Figure 1:
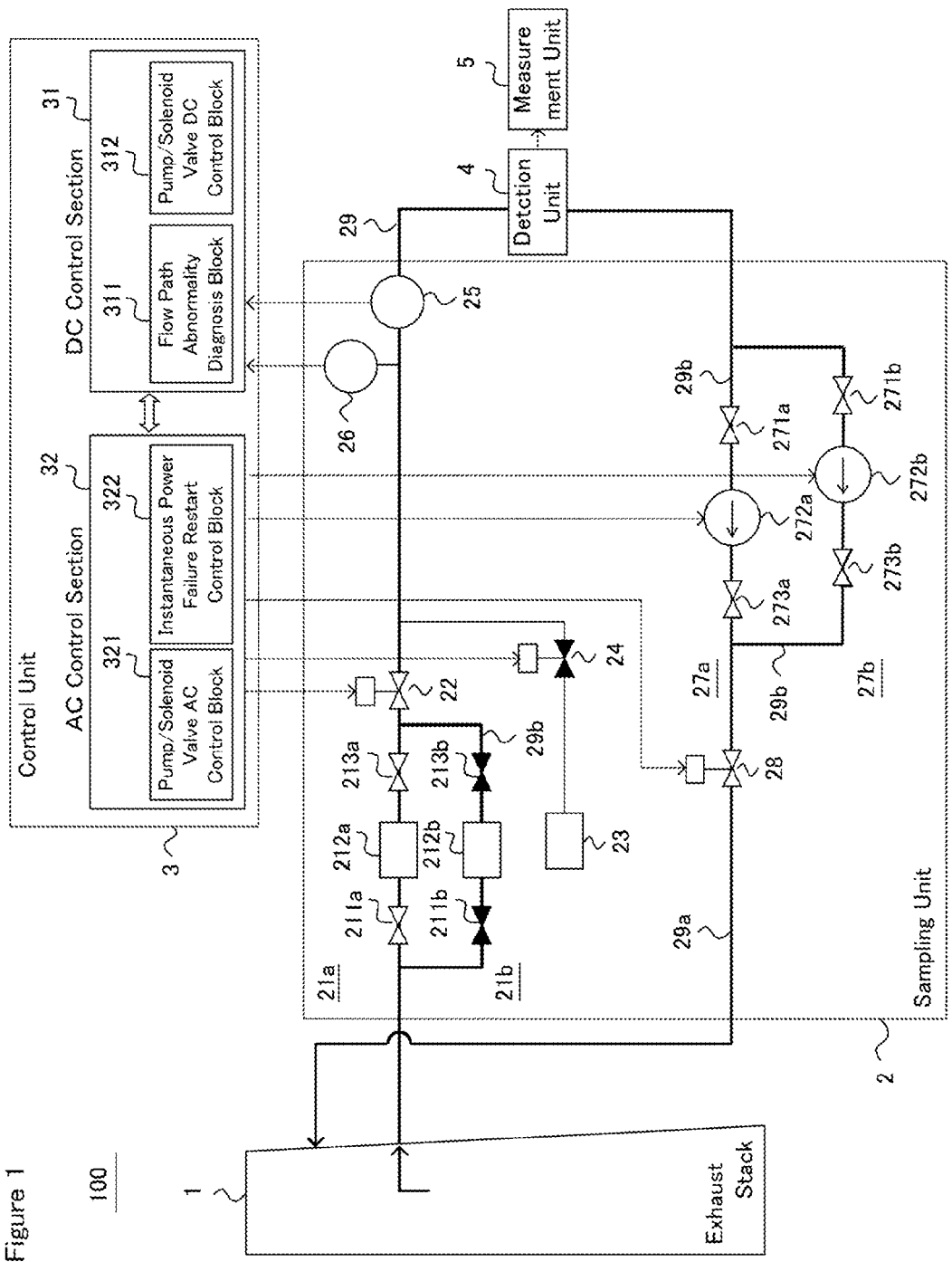
FIG. 1 is a diagram showing the configuration of a radiation monitor according to Embodiment 1.

Radiation monitors according to embodiments of the present invention will be described below with reference to drawings. Incidentally, the same reference numerals/characters are given to those identical or equivalent to constitutional portions in the respective drawings and the size and/or the scale size of the corresponding respective constitutional portions are respectively independent. For example, in the case of illustrating the same unchanged constitutional portions between sectional views in which a part of the configuration is changed, the size and/or the scale size of the same constitutional portions may be different. Furthermore, actually, there includes a further plurality of members in the configuration of the radiation monitor; however, for simplicity of explanation, only portions necessary for explanation are described and other portions are omitted.

Embodiment 1

Hereinafter, Embodiment 1 of the present invention will be described with reference to drawings. A radiation monitor 100 shown in FIG. 1 is an exhaust stack gas monitor that is a representative of nuclear reactor facilities. The radiation monitor 100 includes a sampling unit 2, a control unit 3, a detection unit 4, and a measurement unit 5. An exhaust stack 1 is placed at a final discharge end of the nuclear reactor facilities and the like; and an exhaust gas containing a radioactive rare gas is discharged from the discharge end. The sampling unit 2 samples a sampling gas from the exhaust stack 1. The control unit 3 controls the sampling unit 2. The detection unit 4 is connected to the sampling unit 2. A gas flow path 29 in which the sampling gas suctioned from a sampling point is circulated is divided into a common piping portion 29a and branch piping portions 29b. A filter system 21 and a pump system 27 are installed in the branch piping portions 29b. A sampling solenoid valve 22, an exhaust solenoid valve 28, a flow sensor 25, and a pressure sensor 26 are installed in the common piping portion 29a.

The detection unit 4 detects radiation of the radioactive rare gas released from gaseous radioactive materials in the sampling gas and outputs a detection signal to the measurement unit 5 in a state where environmental radiation is shielded. The measurement unit 5 measures the detection signal outputted from the detection unit 4 and outputs an engineering value (cpm, $Bq/cm^3$ etc.) corresponding to radioactivity concentration. Incidentally, the radiation monitor 100 in the drawing is intended for the exhaust stack gas monitor whose sampling point is the exhaust stack. In the actual nuclear reactor facilities, other process to be monitored, such as a containment vessel and a ventilation/air conditioning duct are selected as the sampling point. The radiation monitor is installed in respective facilities; and the sampling point is not limited to the exhaust stack.

The sampling gas to be sampled from the exhaust stack 1 is introduced to the sampling unit 2 having two filter systems. The sampling gas is introduced to the sampling solenoid valve 22 via either a filter system 21a or a filter system 21b, provided in parallel. Surrounding air of the exhaust stack 1 is introduced to a purge solenoid valve 24 via a purge filter 23. The control unit 3 performs switching control of the sampling solenoid valve 22 and the purge solenoid valve 24 by switching operation. The filter system 21a includes a filter inlet valve 211a, a sampling gas filter 212a, and a filter outlet valve 213a. The filter system 21b includes a filter inlet valve 211b, a sampling gas filter 212b, and a filter outlet valve 213b.

The sampling gas filter 212a, the sampling gas filter 212b, and the purge filter 23 are attached with a filter element defined "Guidelines for measurement of released radioactive materials in light water nuclear power reactor facilities," and 99% or more of a particulate substance equal to or more than 0.3 μm is removed. An outlet of the sampling solenoid valve 22 is connected to an outlet of the purge solenoid valve 24; and a subsequent common piping portion is connected to the flow sensor 25 and the pressure sensor 26. The sampling gas or the surrounding air suctioned from the purge filter 23 is introduced to the detection unit 4 after detecting a flow rate by the flow sensor 25 and detecting a pressure by the pressure sensor 26. The sampling gas discharged from the detection unit 4 or the surrounding air suctioned from the purge filter 23 is introduced to either the pump system 27a or the pump system 27b. The sampling gas discharged from the exhaust solenoid valve 28 is returned to the exhaust stack 1.

The pump system 27a includes a pump inlet valve 271a, a pump 272a, and a pump outlet valve 273a. The pump system 27b includes a pump inlet valve 271b, a pump 272b, and a pump outlet valve 273b. Normally, the pump inlet valve 271a, the pump inlet valve 271b, the pump outlet valve 273a, and the pump outlet valve 273b are all opened; and then, switching operation of the pump 272a and the pump 272b are periodically performed by a pump selectin signal of the control unit 3. In the case of replacing the pumps, the replacement is performed after closing the pump inlet valve and the pump outlet valve of the pump system concerned. The sampling solenoid valve 22 and the exhaust solenoid valve 28 use one which operates so as to be opened at power source OFF (in non-excitation) and to be closed at power source ON (in excitation), that is, a solenoid valve with normally open specification. The purge solenoid valve 24 uses one which operates so as to be closed at power source OFF (in non-excitation) and to be opened at power source ON (in excitation), that is, a solenoid valve with normally closed specification.

In the case of replacing the filter element during sampling operation, first, confirmation is made that the pressure of the sampling gas reaches the replacement standard; and after that, the filter inlet valve and the filter outlet valve of the filter system that is not used are opened from the closed states and then the filter element is replaced. Next, the filter inlet valve and the filter outlet valve of the filter system that is used are closed from the opened states and then the filter element is replaced. In the case where a transition of the pressure is stable, it may be managed by periodic replacement in place of managing by the pressure replacement standard. The pump 272a and the pump 272b are installed with suction and exhaust check valves; and a pump chamber is provided with a diaphragm or a metal bellows. The diaphragm or the metal bellows alternately repeats expansion and compression of the pump chamber by reciprocating movement.

The check valves are linked to the pumps 272a, 272b; and therefore, a backward flow does not occur regardless of the operation or stop of the pumps in a state where the pump inlet valve 271a, the pump inlet valve 271b, the pump outlet valve 273a, and the pump outlet valve 273b are all opened. Therefore, it is possible to employ a control system that if a low flow rate alarm or a high vacuum alarm (to be described later) is transmitted, it is regarded as a pump malfunction and the pumps are automatically switched. Actually, the transmission of the low flow rate alarm or the high vacuum alarm is mostly caused by a factor other than the pump, for example, clogging of the filter. Furthermore, there is no emergency of automatic switching; and therefore, generally, the sampling unit is inspected and the cause is removed; and then, the pump is selected to be manually restarted.

An AC electric power (or AC power source) is supplied to the sampling unit 2; and all the pumps and all the solenoid valves are operated by the AC electric power (or AC power source). The AC electric power (or AC power source) is supplied to the control unit 3 from the sampling unit 2. The AC electric power (or AC power source) is converted into a DC electric power (or DC power source) by an inverter (AC-DC power source apparatus) to operate a DC control section 31. The DC control section 31 operates an AC control section 32 via, for example, contacts. The AC control section 32 controls all the pumps and all the solenoid valves. Incidentally, all the solenoid valves may use one that is operated by a simple DC power source in which the AC electric power (or AC power source) is full-wave rectified. The simple DC power source includes a rectifier diode in the inside of a terminal box additionally provided for drawing the AC power source.

Figure 2:
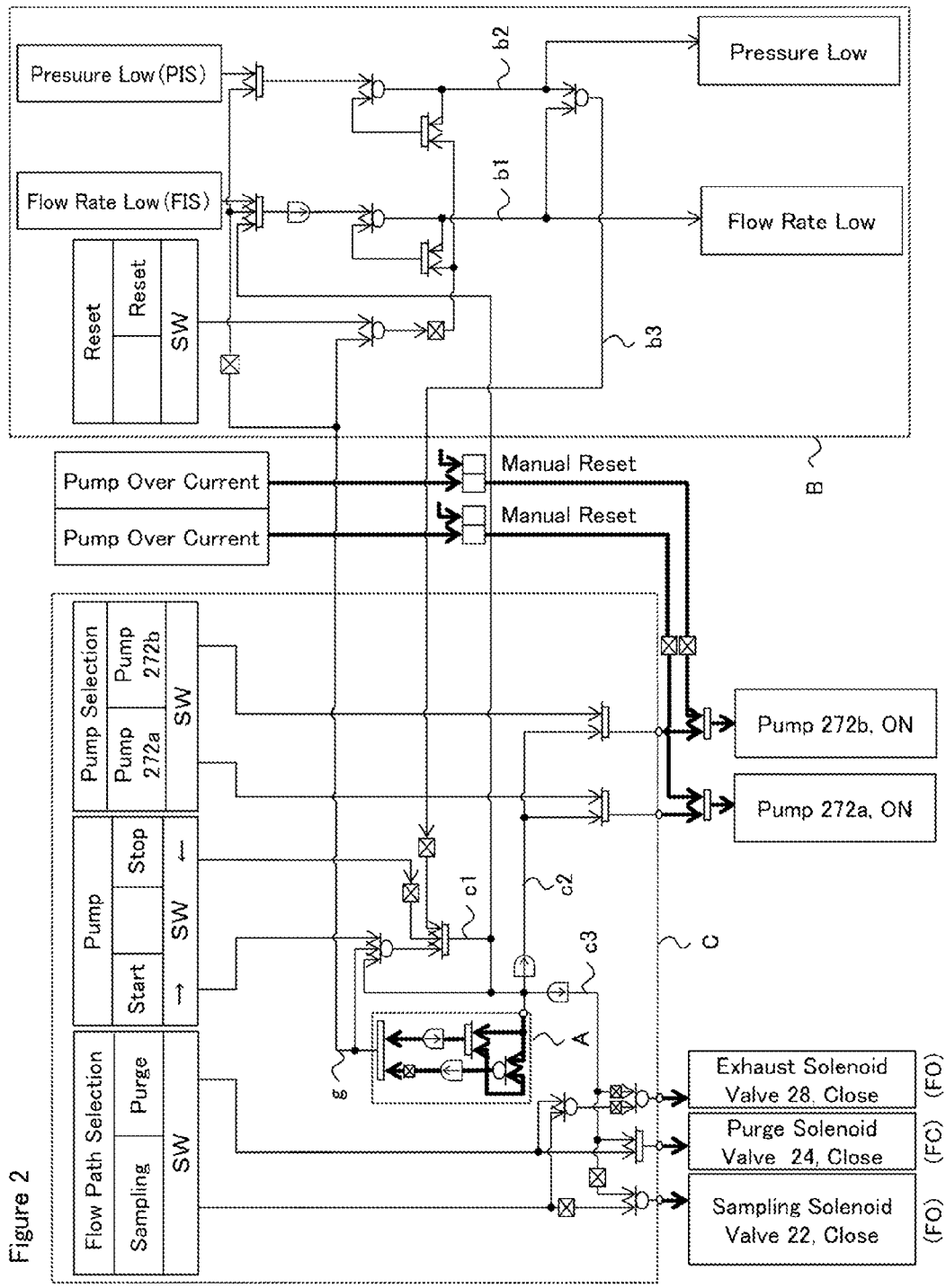
FIG. 2 is a diagram showing control logic of a pump start delay according to Embodiment 1.

FIG. 2 shows control logic of the control unit 3. FIG. 3 represents the relationship between a logic symbol and a function used in FIG. 2. A thin line shows a DC line and a thick line shows an AC line. There exist options of sampling and purge for selecting flow paths of the sampling unit 2. The control unit 3 normally selects the sampling and performs sampling operation of the sampling unit 2. In the sampling operation, the sampling solenoid valve 22 and the exhaust solenoid valve 28 become an opened state of power source OFF and the purge solenoid valve 24 becomes a closed state of power source OFF. Either solenoid valve samples the sampling gas in a state of power source OFF (non-excitation state), that is, in a state where a coil of the solenoid valve does not generate heat. As compared to a purge operation, the sampling operation takes a predominantly long time. The solenoid valve is used in non-excitation, thereby suppressing the solenoid valve from being deteriorated.

In the sampling operation, there maintains a state with a lowest risk with respect to instantaneous power failure restart in which the AC power source is restored from instantaneous interruption of the AC power source and is automatically returned to an original operation state. A change in flow path is suppressed and a state which is easy to restart is maintained. Whereas, in the temporary purge operation, the flow path is selected for the purge and the sampling solenoid valve 22 is a closed state of power source ON. The purge solenoid valve 24 is switched to an open state of power source ON for measuring background. Incidentally, the purge operation is a temporary manipulation with human's intervention; and therefore, even when instantaneous interruption of the power source occurs at this time, the aforementioned risk does not need to be eliminated because of restartable situations by human being.

In the drawing, logic A surrounded by a dashed-dotted line shows control logic pertaining to an instantaneous power failure restart signal g which is outputted by an instantaneous power failure restart control block 322. In the drawing, logic B surrounded by a dashed-dotted line shows control logic pertaining to a low flow rate alarm signal b1, a low pressure alarm signal (or alarm) b2, and a flow path abnormality signal (or alarm) b3, which are outputted by a flow path abnormality diagnosis block 311. The flow path abnormality signal (or alarm) b3 is expressed by OR of the low flow rate alarm signal b1 and the low pressure alarm signal b2.

In the drawing, logic C surrounded by a dashed-dotted line shows control logic pertaining to start/stop of the pumps and open/close of the solenoid valves, which are outputted by a pump/solenoid valve DC control block 312. Upon receiving the instantaneous power failure restart signal g, the flow path abnormality diagnosis block 311 operates so as to respectively interrupt an input of a low flow rate state and an input of a low pressure state and also respectively reset self-holding of the low flow rate alarm signal b1 and the low pressure alarm signal b2. By this operation, "a condition in which a flow path abnormality alarm (signal) is not inputted" serving as a start condition is established; and the pump is automatically restarted by the input of the instantaneous power failure restart signal g.

The flow path abnormality diagnosis block 311 and the pump/solenoid valve DC control block 312 are composed of a logic circuit, a relay circuit, a sequencer, and the like, which are operated by a DC voltage. The AC power source becomes instantaneous OFF in power failure and becomes instantaneous ON in power recovery; whereas, the DC power source slowly decreases and slowly restores. The logic circuit, the relay circuit, the sequencer, and the like of the DC control section 31 remain indeterminate in operation due to variations in transient response of the DC voltage and component response in power failure and in power recovery; and therefore, a time width set to the instantaneous power failure restart signal g is provided in consideration of such circumstances.

In the logic C, the pump/solenoid valve DC control block 312 outputs a pump start signal c2 with a delay of a set time (for example, 1 sec) after a pump start signal c1 is outputted. The pump start signal c2 controls control logic of a pump/solenoid valve AC control block 321 to reverse a related solenoid valve from close to open; and then, disturbance of a sampling gas flow occurred at start is suppressed by starting the pump, for example, after 1 sec.

In a pump stop except for an AC instantaneous power failure, a solenoid valve close signal c3 is outputted after a set time (for example, after 10 sec) after the pump start signal c1 disappears. The solenoid valve close signal c3 controls the control logic of the pump/solenoid valve AC control block 321 to stop the pump; a related solenoid valve is reversed from open to close after the pressure of the flow path is restored to atmospheric pressure; and thus, a load caused by the residual pressure of the flow path at pump start can be reduced and the generated disturbance of the sampling gas flow is suppressed.

Figure 4:
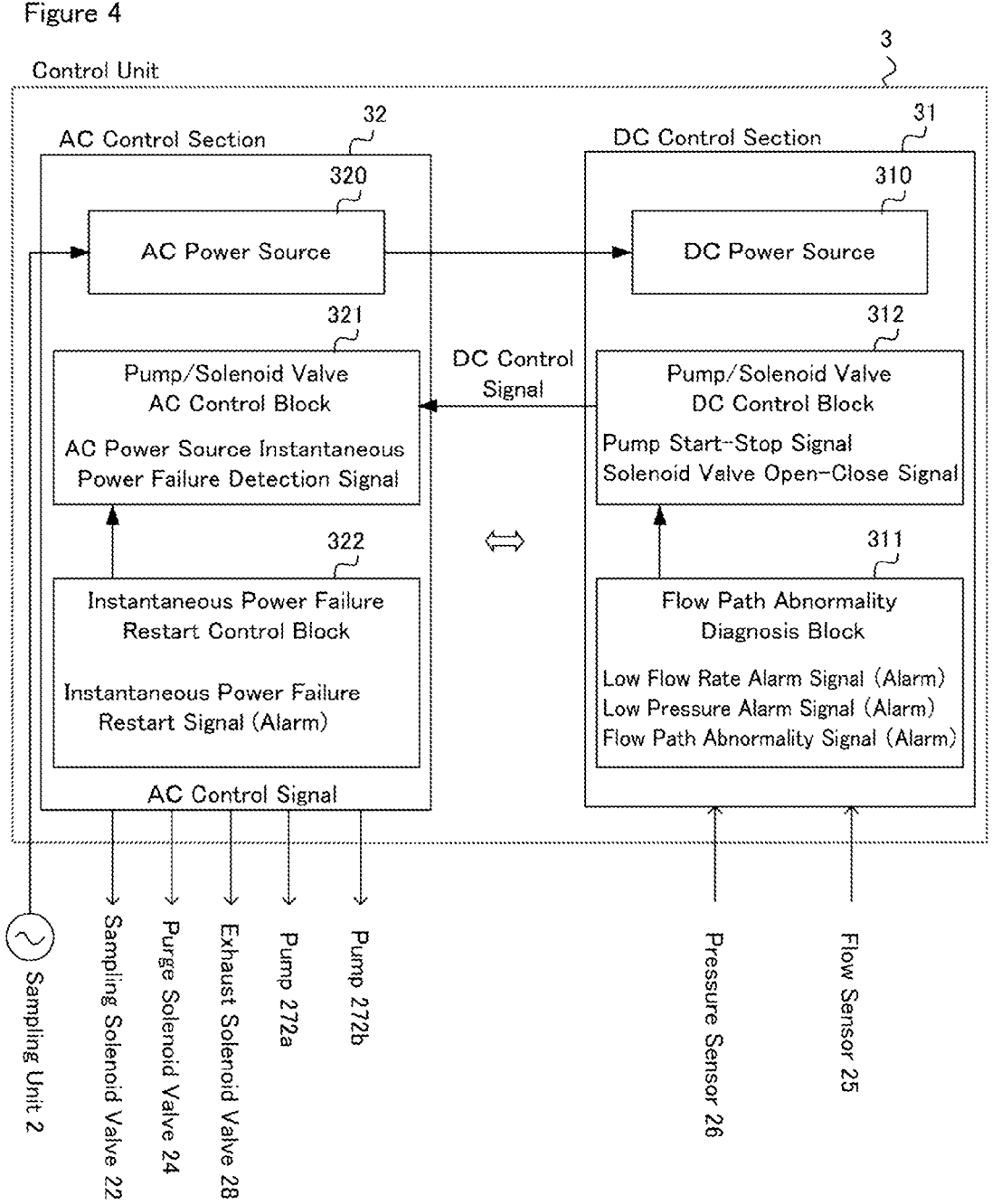
FIG. 4 is a diagram representing the function of a control unit.

FIG. 4 is a diagram representing the function of the control unit 3. The DC control section 31 includes a DC power source 310, the flow path abnormality diagnosis block 311, and the pump/solenoid valve DC control block 312. The DC control section 31 measures a flow rate (measured value) by using a flow rate signal detected by the flow sensor 25 as an input and measures a pressure (measured value) by using a pressure signal detected by the pressure sensor 26 as an input. The flow path abnormality diagnosis block 311 transmits the low flow rate alarm (signal) in the case where the flow rate becomes a state equal to or less than a set value (low flow rate level) and continues for a set time or more under the condition during pump operation. Similarly, the flow path abnormality diagnosis block 311 transmits the low pressure alarm (signal) in the case where the pressure becomes a vacuum state equal to or less than a set value (low pressure level) and continues for a set time or more. Further, the flow path abnormality diagnosis block 311 outputs the flow path abnormality alarm (signal) in the case of satisfying OR of both alarms (signals). The pump/solenoid valve DC control block 312 starts the pump by manual manipulation and self-maintains the pump start signal under the condition that the flow path abnormality alarm (signal) is not inputted. Furthermore, the pump is stopped and the solenoid valve is closed to isolate the flow path by inputting a pump stop signal or the flow path abnormality alarm (signal) by manual manipulation.

The AC control section 32 includes an AC power source 320, the pump/solenoid valve AC control block 321, and the instantaneous power failure restart control block 322. The pump/solenoid valve AC control block 321 converts a DC control signal outputted from the pump/solenoid valve DC control block 312 into an AC control signal to directly control start/stop of the pump and also directly control open/close operation of the solenoid valve. When instantaneous interruption occurs in the AC power source from a pump operation state, and in the case where an AC instantaneous interruption time thereof is within a set time, the instantaneous power failure restart control block 322 outputs an AC power source instantaneous power failure detection signal with a set time width. The pump/solenoid valve DC control block 312 outputs the pump start signal (instantaneous power failure restart signal) by using the AC power source instantaneous power failure detection signal as an input. Then, the pump/solenoid valve DC control block 312 self-maintains the pump start signal to automatically restore to the pump operation state just before the instantaneous interruption of the AC power source under the condition that the flow path abnormality alarm is not inputted. Incidentally, the time width of the instantaneous power failure restart signal is set in consideration of variation in operating time of a control device and the solenoid valve and variation enlargement due to a change with age.

Figure 5:
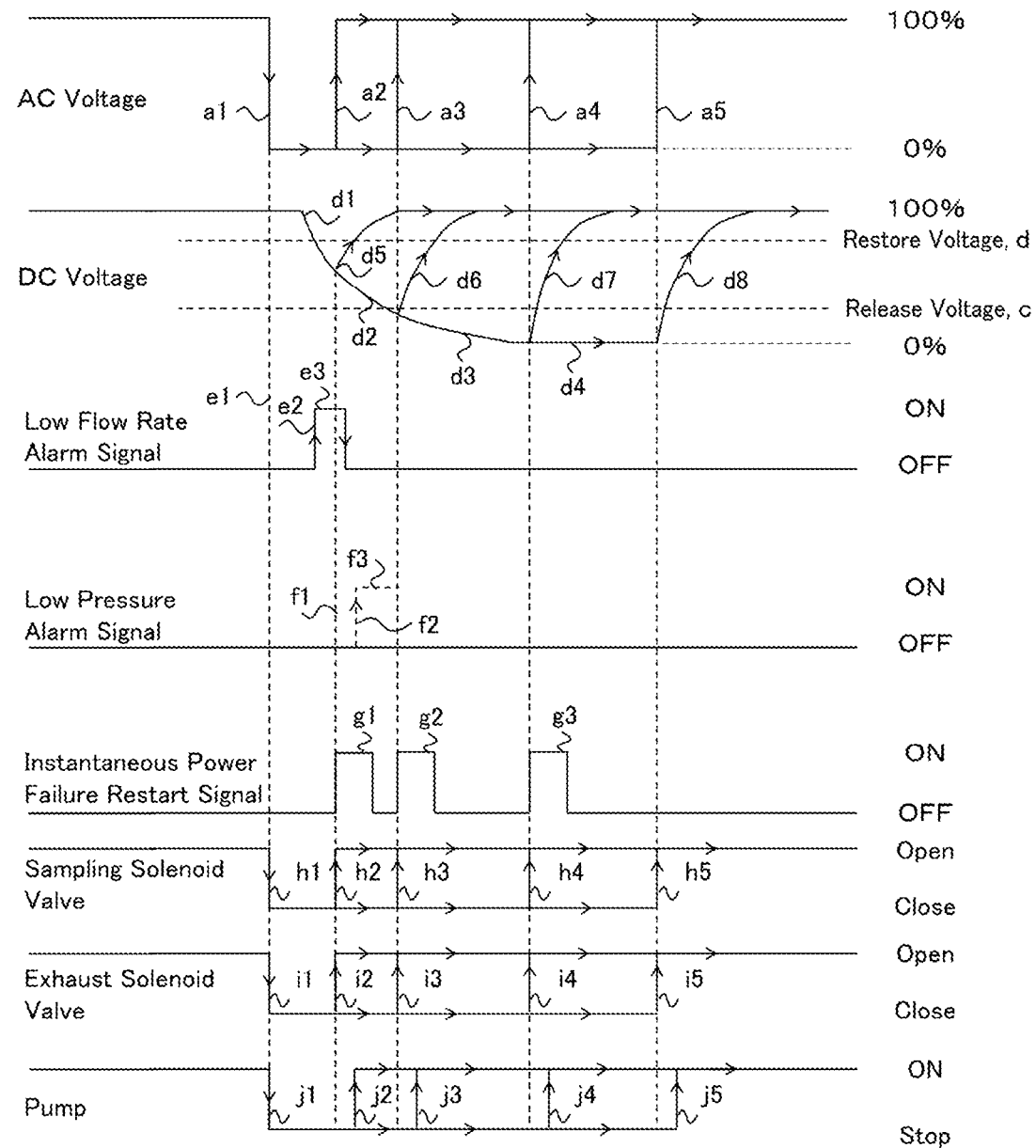
FIG. 5 is a chart showing timing at which instantaneous power failure restart signals of a pump are generated.

FIG. 5 shows a timing chart. In the case where there occurs an instantaneous power failure in the AC power source 320, a voltage of the AC power source is instantaneously interrupted as per reference character a1 and is instantaneously restored to 100% as per reference character a2 to reference character a5 by the timing of restoration of the AC power source, respectively. Whereas, a voltage of the DC power source 310 of the DC control section 31 slowly decreases, for example, for approximately 5 sec or so as per reference character d1 to reference character d4 depending on a discharge state of a large capacity capacitor in which the DC power source includes in the inside thereof. The DC power source slowly restores as per reference character d5 to reference character d8 in synchronization with the timing of restoration of the AC power source, respectively. A restore voltage d and a release voltage c are set in the DC power source.

The low flow rate alarm signal is normally in an OFF (Low) state. In a state where a decreased DC voltage is equal to or more than the release voltage c of the control device, the flow path abnormality diagnosis block 311 starts a detection of a duration time of a low flow rate state at a timing e1 at which the AC power source is interrupted. The flow path abnormality diagnosis block 311 according to this embodiment includes control logics of the input interruption (block) of the low flow rate state and the self-holding reset of the low flow rate alarm signal, to operate upon receiving the instantaneous power failure restart signal g. In the case where there is not the control logic concerned, a low flow rate alarm e3 is transmitted to fail instantaneous power failure restart at a timing e2 at which the decreased DC voltage is equal to or more than the release voltage c of the control device and the low flow rate state exceeds a set duration time (for example, 3 sec).

In this embodiment, the control logic concerned is provided; and thus, although the low flow rate alarm signal is temporarily outputted, a signal g1 (instantaneous power failure restart signal) is outputted when the AC power source is restored within a set time; the start conditions are established by the operation of the input interruption of the low flow rate state and the self-holding reset of the low flow rate alarm signal in the logic B surrounded by the dashed-dotted line; and the pump is automatically restarted after instantaneous power failure. In the case of reference character d6 to reference character d8 at which the DC voltage is restored after the DC voltage becomes equal to or less than the release voltage c, the pump is started and the flow rate is also restored; and therefore, the low flow rate alarm signal is not outputted.

Incidentally, the duration time of the low flow rate state as the condition of the transmission of the low flow rate alarm is previously verified and is determined with a margin on the basis of a capacity of the pump and a volume of the flow path. Furthermore, the low flow rate alarm signal is not outputted at the conditions that the decreased DC voltage is equal to or more than the release voltage c and the low flow rate state does not exceed the set duration time; and therefore, a consideration is made to suppress the above-mentioned temporary low flow rate alarm signal by elongating the duration time of the low flow rate state than an upper limit value of an instantaneous power failure time condition, and a consideration is also made to restrict the duration time from the viewpoint of flow path protection.

Similarly, the low pressure alarm signal is normally in an OFF state. The flow path abnormality diagnosis block 311 according to this embodiment includes control logics of the input interruption of the low pressure state and the self-holding reset of the low pressure alarm signal to operate upon receiving the instantaneous power failure restart signal g. In the flow path abnormality diagnosis block 311, if the pressure of the sampling gas is vibrated to occur a decrease in pressure in synchronization with the timing of the pump start of reference character f1 in the state where the decreased DC voltage is equal to or more than the release voltage c, a detection of the duration time of the low pressure state is started. If the decreased DC voltage is equal to or more than the release voltage c and the low pressure state exceeds the set duration time (for example, 3 sec), the low pressure alarm is transmitted to fail instantaneous power failure automatic restart as per reference character f2 when there is not the control logic concerned. According to this embodiment, the control logic concerned is provided; and thus, the low pressure alarm is not transmitted and the pump is automatically restarted after instantaneous power failure.

The sampling solenoid valve 22 and the exhaust solenoid valve 28 are in an open state at power source ON. By a power failure of the AC power source, the sampling solenoid valve 22 and the exhaust solenoid valve 28 are instantaneously changed from open to close as per reference character h1 and reference character i1, respectively. At this time, the pump is instantaneously stopped as per reference character j1. Upon restoration of the AC power source, when signals g1 to g3 (instantaneous power failure restart signal) are respectively outputted, the sampling solenoid valve 22 is changed in state from close to open as per reference character h2 to reference character h5, respectively. Similarly, the exhaust solenoid valve 28 is changed in state from close to open as per reference character i2 to reference character i5, respectively. Similarly, the pump 272 is changed in state from stop to operation as per reference character j2 to reference character j5, respectively, with a delay of a set time after the open of the exhaust solenoid valve 28 (or the sampling solenoid valve 22).

It is preferable that, for example, a thermal flow sensor composed of a heater and a temperature sensor is applied as the flow sensor 25; and its flow rate signal is inputted to the sequencer or the like to measure a flow rate. The thermal flow sensor detects the flow rate from the relationship between the flow rate and a gas contact temperature of the temperature sensor. Furthermore, the flow rate may be measured by using an area type flowmeter with a reed switch and the low flow rate alarm signal may be outputted by contacts of the reed switch. In this regard, however, there exists a reed switch whose dead band is 20 to 30% of a full scale. If the low flow rate alarm is once transmitted by a large pulsation of the sampling gas, an alarm state cannot be automatically reset in a state where the filter is clogged and the flow rate is decreased from an initial value even when the pump is restarted to restore the flow rate. It becomes a failure factor of instantaneous power failure automatic restart; and accordingly, the pulsation of the sampling gas needs to be damped by providing an orifice or the like just before/behind the flowmeter with the reed switch.

As described above, even when there occurs an instantaneous power failure of the AC power source due to an accident or the like of a plant power source system, and if its power failure time is within a predetermined time, the radiation monitor according to Embodiment 1 has a function to make the pump automatically restart when the power source is restored. The instantaneous power failure restart control block 322 that is operated by the AC power source detects the instantaneous power failure of the AC power source and outputs the instantaneous power failure restart signal having a set time width if the instantaneous power failure time is within the set time. The flow path abnormality diagnosis block 311 interrupts (blocks) an input of a flow rate abnormality state and resets self-holding of the low flow rate alarm by the instantaneous power failure restart signal; and thus, even when hunting of flow rate and pressure occurs by disturbance of the flow of the sampling gas in instantaneous power failure restart, the flow path abnormality diagnosis block 311 establishes the start conditions so as not to obstruct instantaneous power failure restart and the pump/solenoid valve AC control block 321 is controlled to restart the pump and to restore to a driving state just before the instantaneous power failure.

Furthermore, the pump/solenoid valve DC control block 312 continues a state where the sampling solenoid valve 22 and the exhaust solenoid valve 28 are opened at power source OFF in any of just before the instantaneous power failure, during the instantaneous power failure, and in restoring the power source by the operation of the control logic pertaining to a pump start delay and the control logic pertaining to a solenoid valve close delay. Large disturbance is not made to occur in the flow of the sampling gas in the instantaneous power failure restart; and therefore, there can be supplied the radiation monitor which is highly reliable from the viewpoint of continuing the sampling with priority in the instantaneous power failure restart.

There applied the solenoid valve which operates to be opened at power source OFF in the normal sampling operation. If insulation of the coil is deteriorated by self-heating or if an incoming foreign substance sticks in the inside of the solenoid valve, the stuck substance changes in quality and has viscosity under a high temperature due to heat generation of the coil; and accordingly, an operational failure of the solenoid valve is brought about. A factor in which such an operational failure of the solenoid valve is brought about is essentially eliminated; and therefore, a failure rate of the solenoid valve is dramatically decreased. Furthermore, sampling operation can be continued also with respect to unexpected coil disconnection of the solenoid valve. Reliable measurement management with no miss can be performed also with respect to a temporary release of radioactive gaseous waste in an accident in nuclear reactor facilities (breakage in radioactive gaseous waste treatment facilities, a fall of fuel assembly, and the like); and therefore, an advantageous effect is exhibited that reliability of the radiation monitor is considerably improved from the view point of release control of radioactive materials. The pump start can be smoothly achieved by the control logic pertaining to the pump start delay and the control logic pertaining to the solenoid valve close delay; and therefore, an advantageous effect is exhibited that a pump load at start is reduced and thus reliability can be improved.

Embodiment 2

Figure 6:
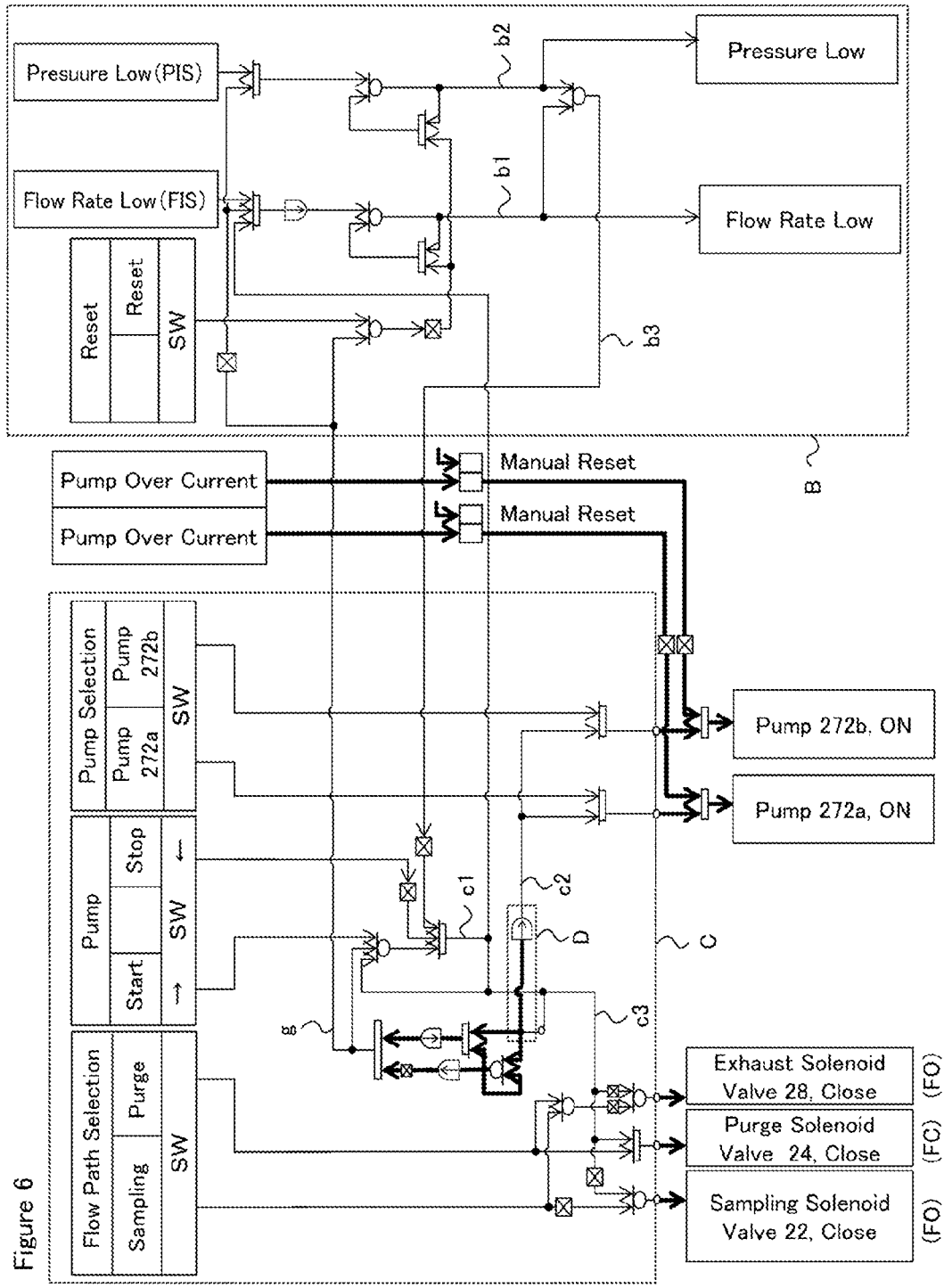
FIG. 6 is a diagram showing control logic of a pump start delay according to Embodiment 2.

In the logic C surrounded by the dashed-dotted line (see FIG. 2) according to Embodiment 1, the solenoid valve of the flow path selected by the pump start signal c1 of the pump/solenoid valve DC control block 312 is operated from close to open and then the pump is started with the time delay of the set time. FIG. 6 shows control logic of a control unit 3 according to Embodiment 2. The control logic according to this embodiment is provided with logic D surrounded by a dashed-dotted line (pump start delay means). When an AC power source is supplied and a condition in which a pump start signal c1 is outputted is established, as in Embodiment 1, a pump is started with a delay with respect to a solenoid valve of a flow path selected by the pump start signal c1.

In the radiation monitor according to Embodiment 1, when the instantaneous power failure time of the AC power source is short, the AC power source is restored from a state where the pump/solenoid valve DC control block 312 continuously outputs the pump start signal c1. Whereas, a radiation monitor according to this embodiment is provided with the logic D; and thus, the pump is started after the solenoid valve is opened including even the case where an instantaneous power failure time of the AC power source is short. Therefore, reliability of instantaneous power failure automatic restart is further improved with respect to the simultaneous occurrence of an open of the solenoid valve and a start of the pump. Furthermore, in the case of using an area type flowmeter with a reed switch, the inner diameter of an orifice to be installed for dumping can be broadened; and therefore, an advantageous effect is exhibited that a load of the pump becomes lighter.

Embodiment 3

A solenoid valve is incused with an arrow on a main body thereof, the arrow representing a flow direction. The solenoid valve is generally mounted in a flow path so that the arrow corresponds to the flow direction of a sampling gas.

Figure 7:
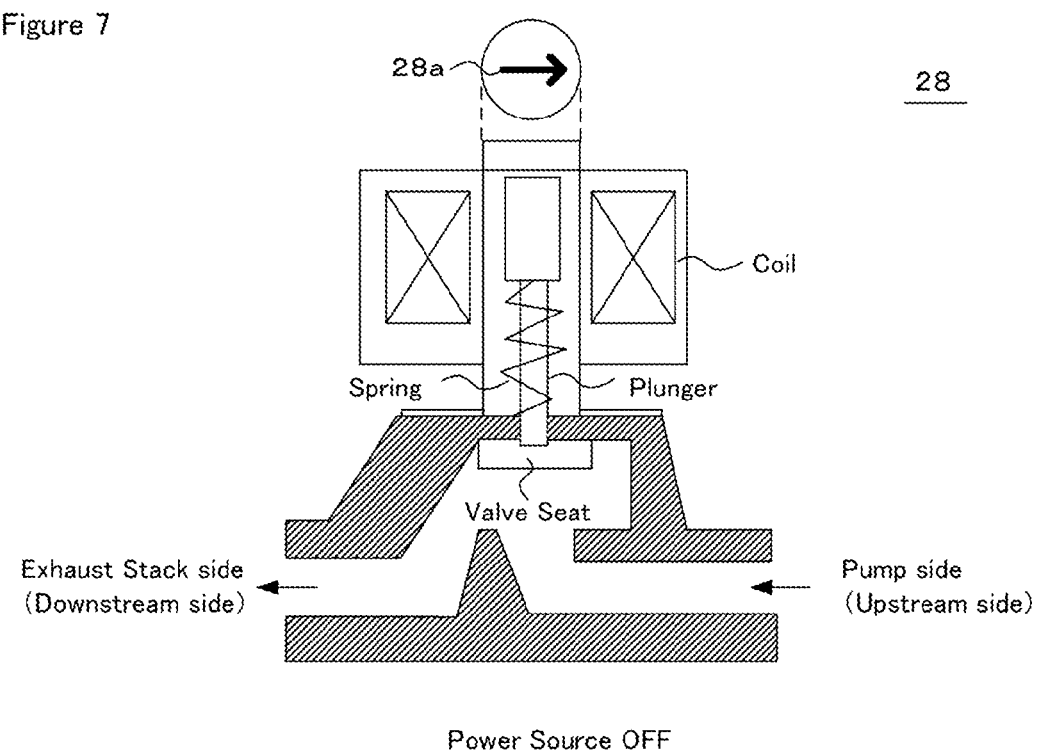
FIG. 7 is a view showing the structure of a solenoid valve according to Embodiment 3.

In Embodiment 3, as shown in FIG. 7, an exhaust solenoid valve 28 is mounted in a flow path so that the direction of an arrow 28a incused on a main body of the solenoid valve is opposite to the flow direction of a sampling gas, the arrow 28a showing a standard mounting direction. Therefore, the direction (pointed tip) of the arrow 28a points to the upstream side of the gas flow path.

The exhaust solenoid valve 28 strengthens a closing action by the structure of a check valve in the solenoid valve when a positive pressure from the exhaust stack side is applied in a closed state of power source ON; on the contrary, the structure of the check valve acts such that the solenoid valve is reversed from the closed state of power source ON to an opened state of power source OFF and, when a pump is started, an internal valve is pushed up by its positive pressure to expedite a reverse operation from close to open. In the exhaust solenoid valve 28, a valve seat changes in quality to have adherence and an incoming foreign substance sticks to the valve seat or a plunger head or changes in quality to have adherence; and thus, there occurs a delay with age in the open operation in instantaneous power failure automatic restart. According to an installation method of the exhaust solenoid valve according to this embodiment, actualization of a latent inhibitory factor of instantaneous power failure automatic restart is suppressed by the furtherance action of the open operation and reliability of the instantaneous power failure automatic restart can be further improved.

Embodiment 4

Figure 8:
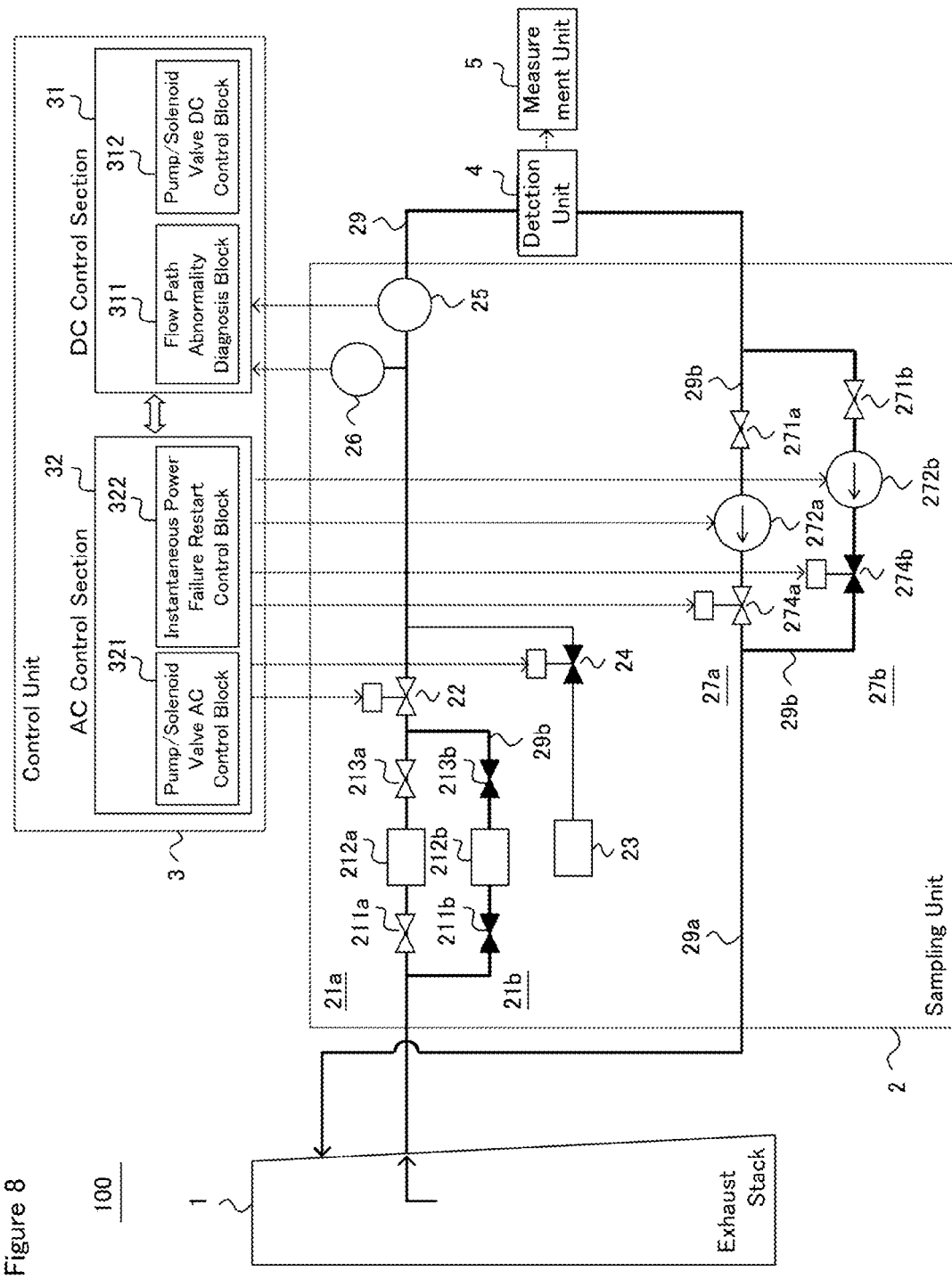
FIG. 8 is a diagram showing the configuration of a radiation monitor according to Embodiment 4.

FIG. 8 shows the configuration of a radiation monitor according to Embodiment 4. A pump 272a and a pump 272b are installed in parallel. In place of the pump outlet valve for each pump (pump outlet valve 273a and pump outlet valve 273b) and the common exhaust solenoid valve (exhaust solenoid valve 28) in Embodiment 1, an exhaust solenoid valve (or pump outlet solenoid valve) for each outlet of a pump 274a, 274b is mounted. The pump outlet solenoid valve 274a (first exhaust solenoid valve) operates so as to be opened at power source OFF; and the pump outlet solenoid valve 274b (second exhaust solenoid valve) operates so as to be opened at power source ON.

Figure 9:
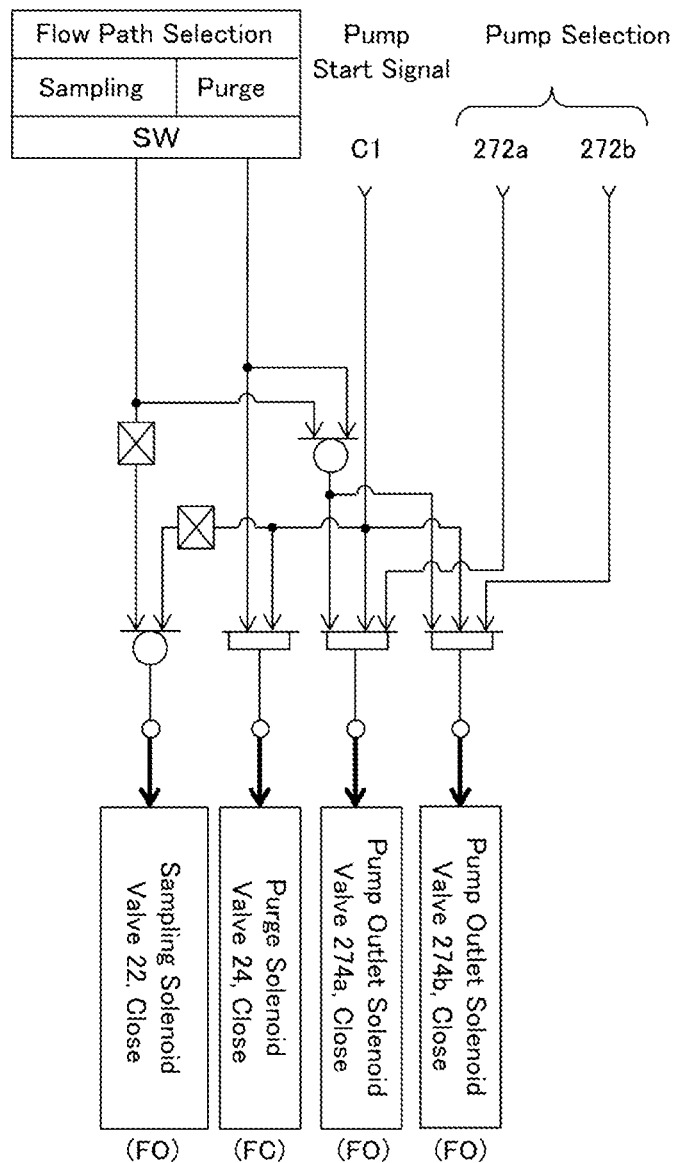
FIG. 9 is a diagram showing control logic of a solenoid valve according to Embodiment 4.

FIG. 9 shows logic of control operation in a sampling solenoid valve 22, a purge solenoid valve 24, the pump outlet solenoid valve 274a, and the pump outlet solenoid valve 274b. A pump selection signal and a pump start signal c1 are inputted to the control logic of the pump outlet solenoid valve 274a and the pump outlet solenoid valve 274b. The pump outlet solenoid valve 274a and the pump outlet solenoid valve 274b are opened in conjunction with a start of the selected pump.

Figure 10:
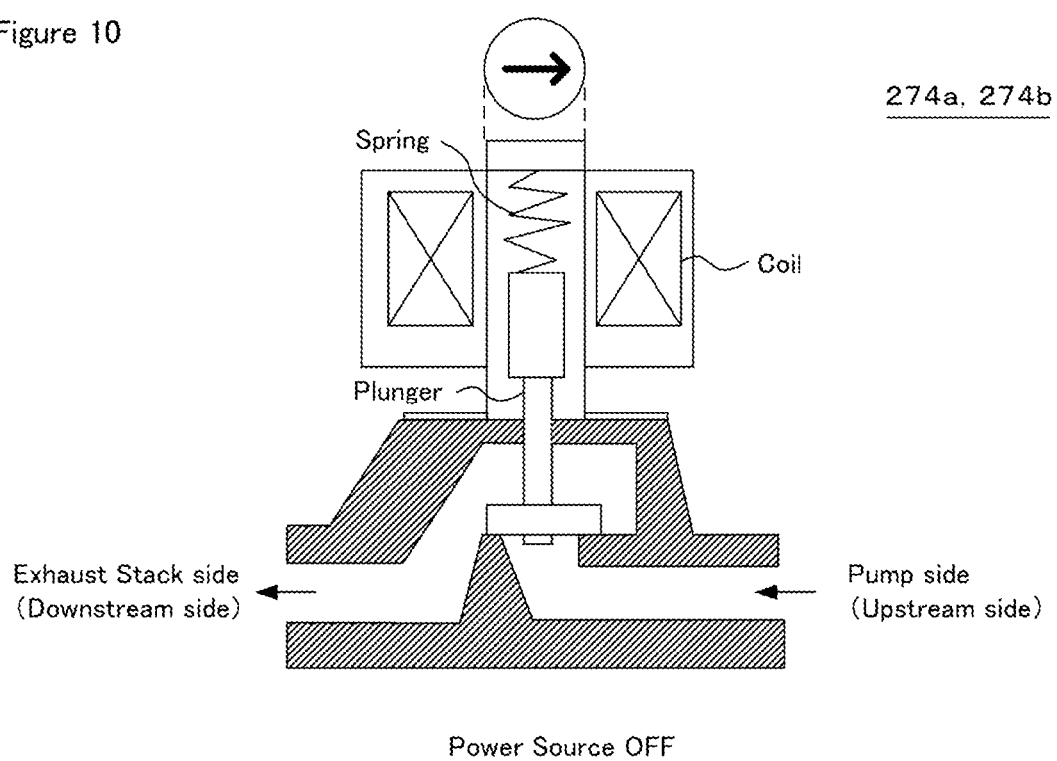
FIG. 10 is a view showing the structure of the solenoid valve according to Embodiment 4.

FIG. 10 represents a section of the pump outlet solenoid valve 274a and the pump outlet solenoid valve 274b. The pump outlet solenoid valve 274 strengthens a closing action by the structure of a check valve in the solenoid valve when a positive pressure is applied from the exhaust stack side in a closed state of power source OFF; on the contrary, the structure of the check valve acts such that the solenoid valve is reversed from the closed state of power source OFF to an opened state of power source ON and when the pump is started, an internal valve is pushed up by its positive pressure to expedite a reverse operation from close to open. As in Embodiment 3, actualization of a latent inhibitory factor of instantaneous power failure automatic restart is suppressed and reliability of the instantaneous power failure automatic restart can be further improved; and the solenoid valve that becomes a high temperature of approximately 100° C. in excitation is cooled by a flow of a sampling gas and the life of the solenoid valve can be prolonged. Furthermore, as compared to Embodiment 1, a configuration becomes simple and a reduction in cost can be achieved.

Incidentally, the present invention can freely combine the respective embodiments and appropriately change and/or omit the respective embodiments, within the scope of the present invention.

DESCRIPTION OF REFERENCE NUMERALS

1 Exhaust stack; 2 Sampling unit; 21*a*, 21*b* Filter system; 211*a*, 211*b* Filter inlet valve; 212*a*, 212*b* Sampling gas filter; 213*a*, 213*b* Filter outlet valve; 22 Sampling solenoid valve; 23 Purge filter; 24 Purge solenoid valve; 25 Flow sensor; 26 Pressure sensor; 27*a*, 27*b* Pump system; 271*a*, 271*b* Pump inlet valve; 272*a*, 272*b* Pump; 273*a*, 273*b* Pump outlet valve; 274*a*, 274*b* Pump outlet solenoid valve; 28 Exhaust solenoid valve; 29 Gas flow path; 3 Control unit; 31 DC control section; 311 Flow path abnormality diagnosis block; 312 Pump/solenoid valve DC control block; 32 AC control section; 321 Pump/solenoid valve AC control block; 322 Instantaneous power failure restart control block; 4 Detection unit; 5 Measurement unit; 100 Radiation monitor

The invention claimed is:

1. A radiation monitor comprising:
   a gas flow path in which a sampling solenoid valve, a purge solenoid valve, a pump, and an exhaust solenoid valve, each being operated by an AC electric power, are provided, and a sampling gas suctioned from a sampling point is circulated;
   a flow sensor installed in said gas flow path;
   a pressure sensor installed in said gas flow path;
   an AC control section configured to supply the AC electric power to said sampling solenoid valve, said purge solenoid valve, said pump, and said exhaust solenoid valve, and when a flow path abnormality signal is received, the AC control section is configured to control said sampling solenoid valve, said purge solenoid valve, and said exhaust solenoid valve to be closed and is configured to control said pump to be stopped;
   a DC control section operated by a DC electric power in which the AC electric power supplied from said AC control section is converted, the DC control section configured to output the flow path abnormality signal in the case where a measured value of said flow sensor or a measured value of said pressure sensor is lower than a set value;
   a detection unit which detects radiation to be released from the sampling gas suctioned to said gas flow path, and configured to output a detection signal; and
   a measurement unit which measures the detection signal outputted from said detection unit, and configured to output radioactivity concentration,
   wherein said AC control section is configured to output an AC power source instantaneous power failure detection signal to said DC control section when a decrease in AC voltage is detected;
   said DC control section is configured to measure a duration time of the AC power source instantaneous power failure detection signal when the AC power source instantaneous power failure detection signal is received from said AC control section, and output an instantaneous power failure restart signal to said AC control section if the AC voltage is restored within a time shorter than the set value; and
   said AC control section is configured to perform switching control from close to open of said sampling solenoid valve, said purge solenoid valve, and said exhaust solenoid valve, and restart said pump after a constant time when the instantaneous power failure restart signal is received from said DC control section.

2. The radiation monitor according to claim 1,
   wherein said exhaust solenoid valve is installed on the lower stream side of said pump and in a common piping portion of said gas flow path.

3. The radiation monitor according to claim 1,
   wherein said exhaust solenoid valve is installed on the lower stream side of said pump and in a branch piping portion of said gas flow path.

4. The radiation monitor according to claim 2,
   wherein said sampling solenoid valve and said exhaust solenoid valve are opened in non-excitation; and said purge solenoid valve is closed in non-excitation.

5. The radiation monitor according to claim 3, wherein said sampling solenoid valve and said exhaust solenoid valve are opened in non-excitation; and said purge solenoid valve is closed in non-excitation.

6. The radiation monitor according to claim 2,
   wherein, in the case where a decrease time of the AC voltage is longer than a predetermined time, said AC control section is configured to restart the pump after a set time after the switching control from close to open of said sampling solenoid valve, said purge solenoid valve, and said exhaust solenoid valve is performed.

7. The radiation monitor according to claim 3,
   wherein, in the case where a decrease time of the AC voltage is longer than a predetermined time, said AC control section is configured to restart the pump after a set time after the switching control from close to open of said sampling solenoid valve, said purge solenoid valve, and said exhaust solenoid valve is performed.

8. The radiation monitor according to claim 2,
   wherein said sampling solenoid valve and said purge solenoid valve are mounted in said gas flow path in a state where the direction of an arrow showing a mounting direction is pointed to the upper stream side.

9. The radiation monitor according to claim 3,
   wherein said exhaust solenoid valve is mounted in said gas flow path in a state where the direction of an arrow showing a mounting direction is pointed to the upper stream side.

* * * * *